United States Patent
Jang et al.

(10) Patent No.: US 6,571,607 B2
(45) Date of Patent: Jun. 3, 2003

(54) FLUID LEAK DETECTION VIA THERMAL SENSING

(75) Inventors: Ruei-Hung Jang, Taipei (TW); Chih-Lin Ying, Hsin-Chu (TW); Tien-Hsing Woo, Taipei (TW); Ming-Kuo Yu, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/881,389

(22) Filed: Jun. 13, 2001

(65) Prior Publication Data

US 2002/0189326 A1 Dec. 19, 2002

(51) Int. Cl.[7] .................. G01N 17/00; G01N 27/22; G01N 21/17; G08B 21/00; G01M 3/40
(52) U.S. Cl. .................. 73/40; 73/40.5 R; 73/25.03; 73/61.46
(58) Field of Search .................. 73/40, 25.03, 61.46, 73/40.5 R

(56) References Cited

U.S. PATENT DOCUMENTS

| | | | | |
|---|---|---|---|---|
| 4,091,657 A | * | 5/1978 | Jackson | 73/40 |
| 4,125,822 A | * | 11/1978 | Perren et al. | 338/34 |
| 4,159,638 A | * | 7/1979 | Potter | 73/61.46 |
| 4,221,125 A | * | 9/1980 | Oliver et al. | 73/61.46 |
| 4,710,353 A | * | 12/1987 | Tanaka et al. | 422/68 |
| 5,295,360 A | * | 3/1994 | Olds et al. | 62/127 |
| 5,378,995 A | * | 1/1995 | Kudo et al. | 324/693 |
| 5,379,630 A | * | 1/1995 | Lacey | 73/25.03 |
| 5,546,790 A | * | 8/1996 | Kudo et al. | 73/40.5 R |
| 5,553,482 A | * | 9/1996 | Mathews et al. | 73/40 |

* cited by examiner

Primary Examiner—Hezron Williams
Assistant Examiner—David J. Wiggins
(74) Attorney, Agent, or Firm—Tung & Associates

(57) ABSTRACT

Fluid leak detection through thermal sensing is disclosed. A sensor includes one or more flexible, thermally conductive, fluid isolating layers, and a thermally sensitive detector situated within the flexible, thermally conductive, fluid isolating layers. The detector is responsive to a temperature change resulting from leaking fluid coming in contact with the sensor. The sensor may also including an affixing mechanism, such as glue, on the isolating layers, to affix the sensor to a potential fluid leak source, such as a tank or a piping line. The sensor may further include connectors located at its ends. The detector may be a thermally sensitive resistor, such as platinum or nickel, and the, fluid isolating layers may be capton.

19 Claims, 6 Drawing Sheets

PRIOR ART

PRIOR ART

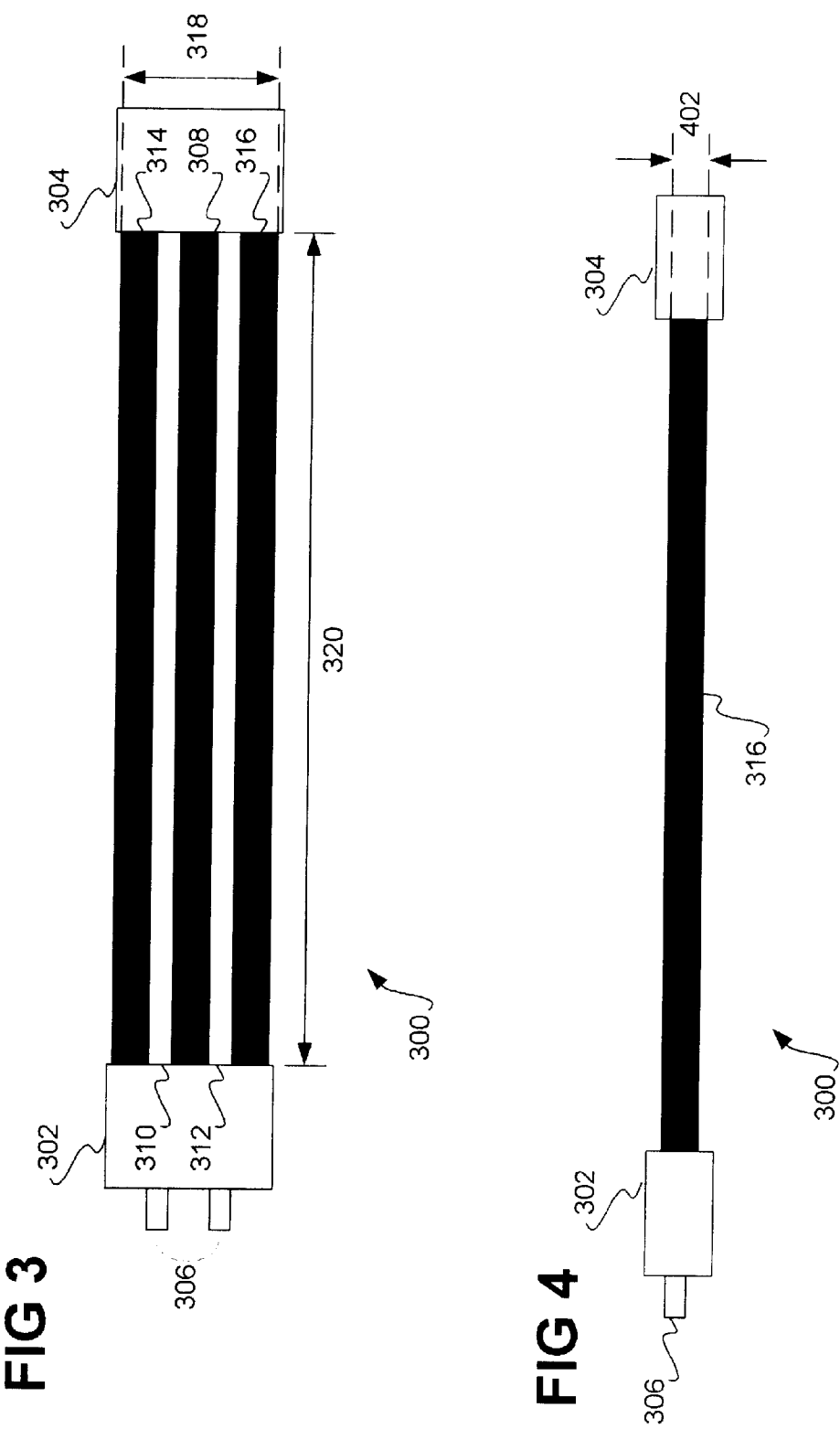

ULUID LEAK DETECTION VIA THERMAL SENSING

FIELD OF THE INVENTION

This invention relates generally to fluid leak detection, and more specifically to such detection by thermal sensing. A thermally sensitive detector senses a difference in temperature when a fluid leak occurs, where the detector is isolated from the leaking fluid. The thermally sensitive detector may be a thermally sensitive resistor, the resistance of which changes with differences in temperature.

BACKGROUND OF THE INVENTION

Semiconductor manufacture, as well as other processes and applications, rely on the use of fluids, many of which are flammable. The fluids are typically stored in tanks, such as reserving tanks, and are moved from one location to another through piping lines. The detection of leaks of these fluids is usually important in such critically precise processes as semiconductor manufacture.

FIG. 1 shows one existing manner by which fluid leaks can be detected. The tank 102 stores liquid. The tank 102 is connected to a leak detector 104 at piping points 106 and 108. When there is no leak in the tank 102, the pressure of the fluid is the same at both points 106 and 108, such that the detector 104 senses a differential pressure of zero across the points 106 and 108. However, when there is a leak in the tank 102, the pressure of the fluid is slightly more at one of the points 106 and 108. This non-zero differential pressure is sensed by the detector 104, which provides notification that a leak has been detected.

The differential pressure approach to leak detection of FIG. 1 has several disadvantages, however. The volume of fluid stored in the tank 102 must be sufficiently great for the minute differences in pressure across the points 106 and 108 to be detected by the leak detector 104. Thus, the differential pressure manner of leak detection may not be appropriate for non-tank applications, such as piping lines. Leak detection is also point specific. That is, if the leak is too close to the piping points 106 and 108, the differential pressure across them may remain zero even though a leak has occurred, preventing its detection by the detector 104. Finally, since detection occurs as a result of fluid leak dispersion, there can be a significant time lag between when the leak first occurs, and when the leak is detected by the detector 104.

FIG. 2 shows another existing manner by which fluid leaks can be detected. Fluid flows through the piping line 202. The piping line 202 is connected to a leak detector 204 by conductors 206 and 208. Alternatively, the conductors may be integrated within the detector 204 itself. The piping line 202 is normally non-conductive, or has a measurable resistance, between the conductors 206 and 208. As a result, the detector 204 normally does not detect a short between the conductors 206 and 208 when there is no fluid leak and the detector 204 is passing a small amount of current between the conductors 206 and 208. However, when a fluid leak occurs, the zero-resistance nature of the fluid cases a short between the conductors 206 and 208, which is detected by the detector 204. The detector then provides notification that a leak has been detected. This type of leak detection is also applicable to tanks, and not just piping lines as shown in FIG. 2.

The short circuit approach to leak detection of FIG. 2 also has several disadvantages, however. There is no electrical isolation between the conductors 206 and 208 and the fluid during a leak. Therefore, this manner of leak detection is not appropriate for leaks of flammable fluid, which may explode as a result of the current passed between the conductors 206 and 208 by the detector 204. Furthermore, the conductors 206 and 208 typically cannot be fixed to the piping line 202. This means that the detector 204 does not precisely contact the surface of the piping line 202.

Therefore, there is a need to overcome these and other disadvantages of the prior art. Specifically, there is a need for fluid leak detection where large volumes of fluid are not present. Furthermore, there is a need for fluid leak detection that is not point specific. There is also a need for fluid leak detection without a significant time lag between when the leak first occurs and when it is detected. Furthermore, there is a need for fluid leak detection of flammable fluid. Finally, there is a need for fluid leak detection that allows fixing of the leak detector to the piping line, tank, or other source of potential leaks. For these and other reasons, there is a need for the present invention.

SUMMARY OF THE INVENTION

The invention relates to fluid leak detection through thermal sensing. A sensor most generally includes one or more flexible, thermally conductive, fluid isolating layers, and a thermally sensitive detector situated within the flexible, thermally conductive isolating layers. The detector is responsive to a temperature change resulting from leaking fluid coming in contact with the sensor. The sensor may also include an affixing mechanism, such as glue, on the isolating layers, to affix the sensor to a potential fluid leak source, such as a tank or a piping line. Furthermore, the sensor may include electrical connectors located at its ends. At least one of the connectors is receptive to electrical coupling, such as to circuitry to at least indirectly measure the temperature change resulting from the leaking fluid coming in contact with the sensor.

The invention provides for advantages not found within the prior art. Fluid leak detection can be accomplished by the inventive sensor even where large volumes of fluid are not present, because the thermally sensitive detector may be able to detect even minute changes in temperature, and thus minute amounts of leakage. Furthermore, there is no significant time lag between when the leak first occurs and when it is detected, on account of the thermal sensing manner of the invention. The presence of the, fluid isolating layers prevents fluid contact with the thermally sensitive detector, so the inventive sensor can be used for fluid leak detection of flammable fluid, too. The inventive sensor, on account of the flexible nature of the, fluid isolating layers and the affixing mechanism, allows it to be placed nearly anywhere a potential leak may occur, directly fixed on the piping line, tank, or other source of potential leaks.

In one embodiment, the thermally sensitive detector is a thermally sensitive resistor, such that the temperature change resulting from the leaking fluid coming in contact with the sensor causes a measurable change in electrical resistance of the sensor. When the measurable change in resistance in one embodiment is five percent, this indicates the presence of the leaking fluid. The thermally sensitive resistor can be platinum or nickel, whereas the flexible isolating layers can be capton. A system for fluid leak detection may include one or more fluid leak detection sensors as have been described, in a serial, parallel, or combination thereof configuration. Circuitry is electrically coupled to the sensors, and responsive to the measurable change in resistance to detect leaking fluid. Still other embodiments, aspects, and advantages of the invention will become apparent by reading the detailed description that follows, and by referencing the attached drawings.

BRIEF DESCRIPTION OF THE DRAWINGS

FIG. 3 is a diagram of the top view of a sensor for leaking fluid detection, according to an embodiment of the invention.

FIG. 4 is a diagram of the side view of the sensor of FIG. 3.

DETAILED DESCRIPTION OF THE INVENTION

Figure 1:
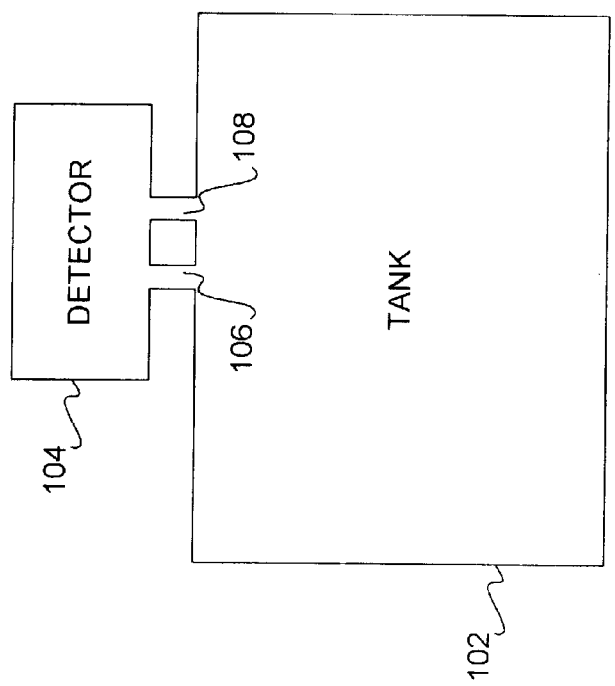
FIG. 1 is a diagram showing the prior art approach to detecting fluid leaks through differential pressure.
Figure 2:
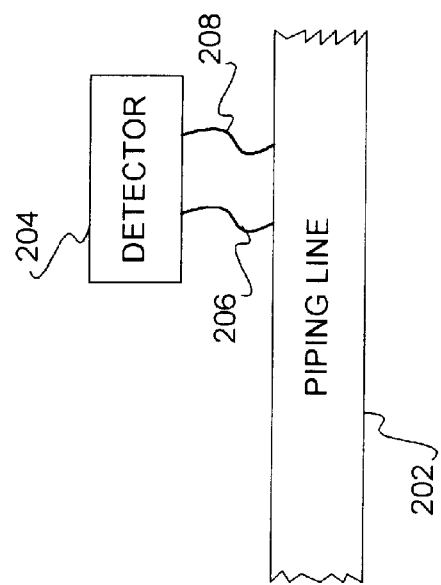
FIG. 2 is a diagram showing the prior art approach to detecting fluid leaks through short circuiting.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 3 shows the top view of a fluid leak detection sensor 300 according to an embodiment of the invention. The sensor 300 includes a connector 302 at one end, and a connector 304 at the other end. The connector 302 is specifically for electrically coupling the sensor to circuitry, and thus includes leads 306 for such electrical connectivity. The connector 304 may also have leads, but this is not shown in the embodiment of FIG. 3. The sensor further includes affixing mechanisms 314 and 316, such as glue, flexible, isolating, and thermally conductive layers 310 and 312, such as capton, and a thermally sensitive detector 308. The detector 308 may be a thermally sensitive resistor, such as platinum or nickel. The main portion of the sensor 300 has a width 318, such as 0.5 centimeters, and a length 320, which may be between 2 and 20 centimeters.

The affixing mechanisms 314 and 316, located on the flexible isolating layers 310 and 312, allow the sensor 300 to be positioned on any potential fluid leak source, such as a reserving tank, a piping line, and so on. The flexible isolating layers 310 and 312 prevent the leaking fluid from contacting directly the thermally sensitive detector 308. This is why the layers 310 and 312 are referred to as isolating layers. The layers 310 and 312 are flexible in that they can be easily bent and are otherwise malleable so that the sensor 300 can be easily affixed to any potential fluid leak source.

The layers 310 and 312 are thermally conductive so that the effect of the leaking fluid's temperature can be sensed by the thermally sensitive isolated detector 308.

The thermally sensitive detector 308 is situated within the flexible isolating layers 310 and 312, and thus is isolated from direct contact with the leaking fluid. The detector 302 is responsive to temperature changes resulting from leaking fluid coming in contact with the sensor 300. For instance, where the detector 308 is a thermally sensitive resistor, the temperature change resulting from the leaking fluid coming in contact with the sensor 300 causes a measurable change in resistance of the detector 308, and hence the sensor 300 as well. Where circuitry is coupled to the leads 306 of the connector 302, the circuitry is able to at least indirectly measure this temperature change. For instance, the circuitry may measure the measurable change in resistance of the detector 308, which indirectly measures the temperature change resulting from leaking fluid contacting the sensor 300. The temperature of the leaking fluid conductively is transferred through the layers 310 and 312, such that it is detected by the detector 308.

FIG. 4 shows the side view of the sensor 300. Specifically, the connector 302, with one of its leads 306, and the connector 304 are shown, along with the affixing mechanism 316. The height 402 of the sensor 300 is substantially less than its width 318 as indicated in FIG. 3. In other words, the sensor 300 is relatively long and flat.

Figure 5:
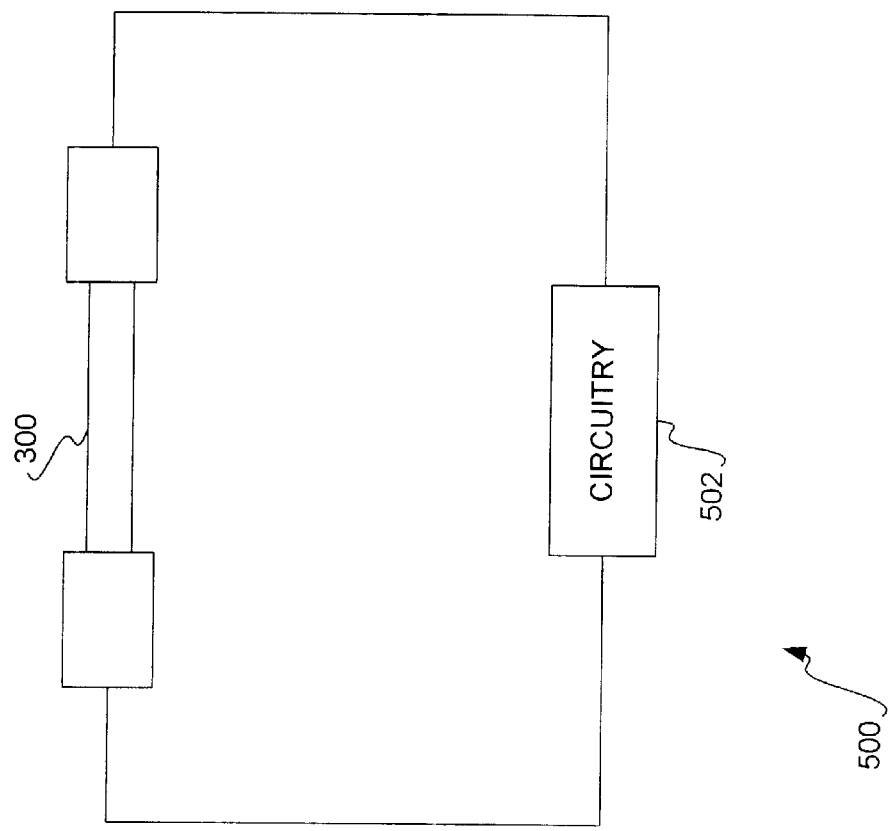
FIG. 5 is a diagram of a system including the sensor of FIG. 3 and additional circuitry, according to an embodiment of the invention.

FIG. 5 shows a system 500 in which the sensor 300 is electrically coupled to circuitry 502. The circuitry 502 preferably is responsive to the measurable change in resistance of the sensor 300 when leaking fluid comes in contact with the sensor 300. The potential fluid leak source to which the sensor 300 is affixed is not specifically shown in FIG. 5. In one embodiment, when the resistance of the sensor 300 changes +/−5%, the circuitry 502 upon detection of such a resistance change indicates that leaking fluid is present. For example, the circuitry 502 may show a light, may send an email to an administrator if connected to a network, may sound a buzzer, and so on.

Figure 6:
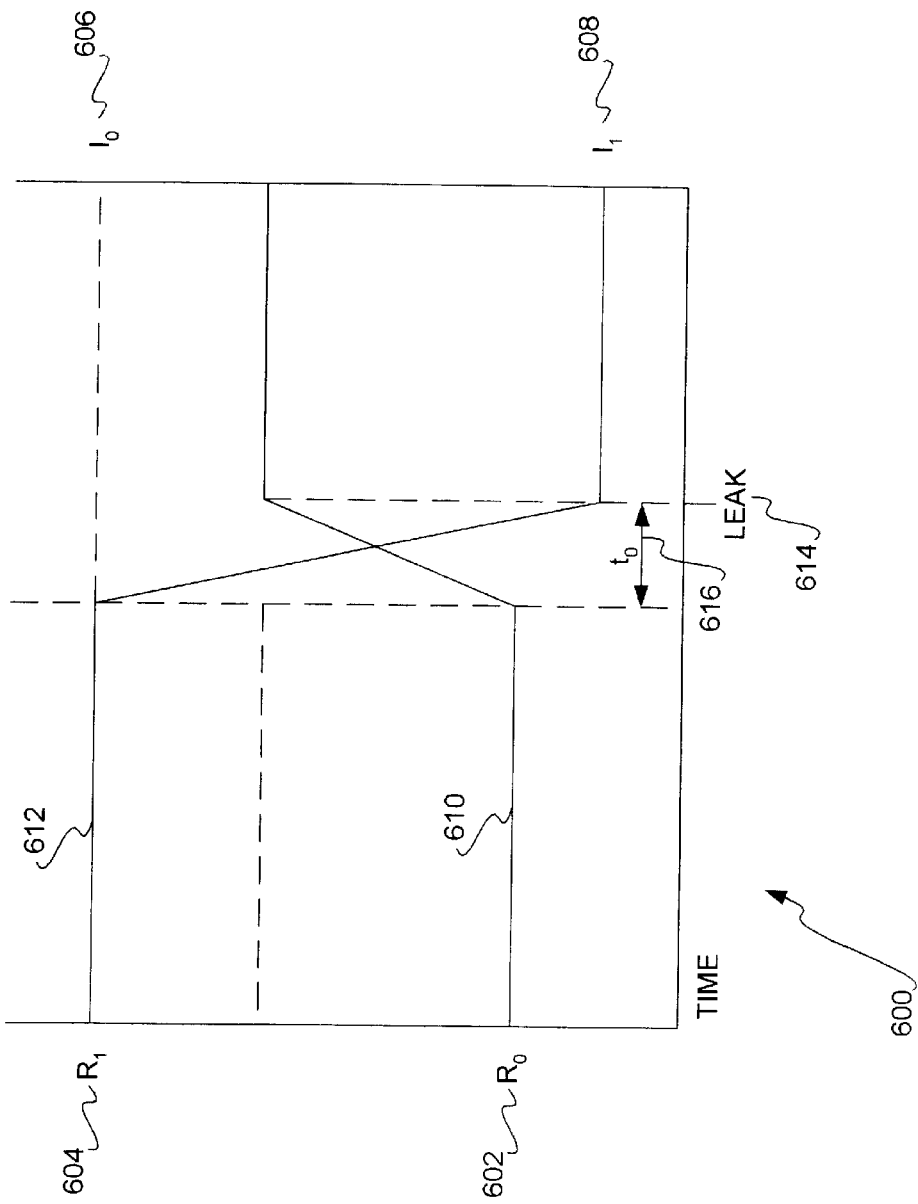
FIG. 6 is a graph showing the principle that governs operation of at least some embodiments of the invention.

FIG. 6 is a graph illustrating the governing principal of the invention, and description thereof is made also with reference to the system 500 of FIG. 5 that has already been described. Initially, the resistance of the sensor 300 detected by the circuitry 502 is $R_0$, as indicated by reference number 602. The circuitry 502 may detect this resistance by applying a set voltage V to the system 500, such that the current flowing through the system 500 is $I_0 = V/R_0$, where the circuitry 502 actually measures the current $I_0$, where this current is indicated by reference number 606.

When a fluid leak occurs, as indicated by reference number 614, the resistance of the sensor, indicated by the line 610 in the graph 600, rises from $R_0$ to $R_1$, indicated by reference number 604, within the time frame $t_0$, indicated by the reference number 616. $R_0$ is the resistance at temperature $T_0$, when no fluid is leaking, and $R_1$ is the resistance at temperature $T_1$, when fluid is leaking. Generally, $R_1 = R_0(1 + \alpha \Delta T)$, where $\Delta T = T_1 - T_0$. The constant $\alpha$ is particular to the thermally sensitive resistor used. For example, for platinum, the constant has a value of 0.00392.

Correspondingly, the current flowing through the system 500 drops to $I_1 = V/R_1$, indicated by the reference number 608, also within the time frame $t_0$. The time frame $t_0$ is substantially short, such that detection of the leaking fluid by the circuitry 502 through measurement of the drop in current (i.e., measurement of the rise in resistance) is nearly instantaneous. In one embodiment, the circuitry 502 is sensitive to changes in current through the system as responsive to the resistance $R_1 = R_0 \pm 5\%$. Furthermore, different types of fluids can be detected by noting their temperatures and appropriately adjusting the voltage V applied.

Figure 7:
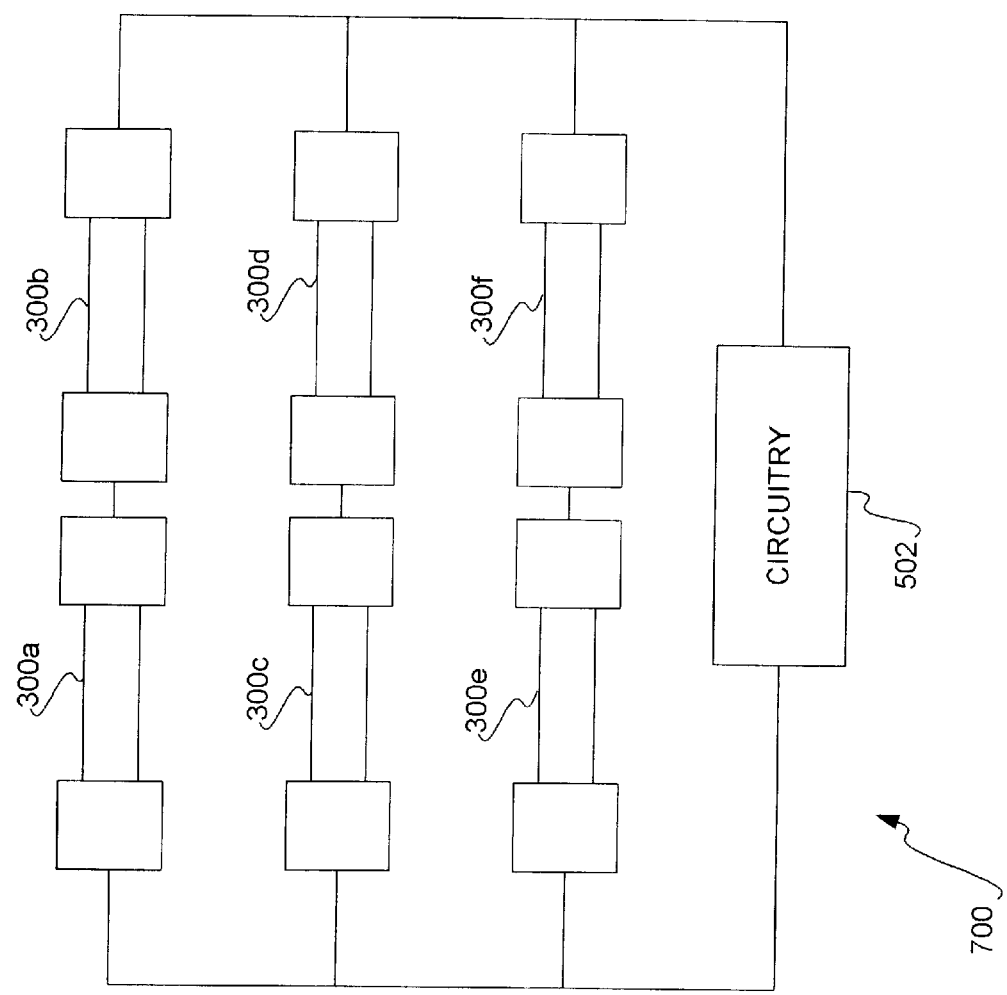
FIG. 7 is a diagram of a system including a number of the sensors of FIG. 3 configured both in parallel and in serial with one another, and additional circuitry, according to an embodiment of the invention.

A number of sensors, such as the sensor 300, may be connected in serial, parallel, or a combination thereof with one another. This allows, for instance, the detection of fluid leaks at several potential fluid leak sources at the same time. An example of such a configuration is shown in FIG. 7. The system 700 includes the sensors 300*a* and 300*b* connected serially, the sensors 300*c* and 300*d* connected serially, and the sensors 300*e* and 300*f* also connected serially. The pair of sensors 300*a* and 300*b*, the pair of sensors 300*c* and 300*d*, and the pair of sensors 300*e* and 300*f* are connected in parallel. This configuration of sensors is then electrically connected to the circuitry 502. Each of the sensors 300*a*, 300*b*, 300*c*, 300*d*, 300*e*, and 300*f* may be the sensor 300, as has been described.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A sensor for fluid leak detection comprising:
   one or more flexible fluid isolating layers, each layer thermally conductive; and,
   a thermally sensitive detector situated within the one or more isolating layers and responsive to a temperature change resulting from leaking fluid coming in contact with the sensor, such that the leaking fluid is prevented from contacting said thermally sensitive detector because of said flexible isolating layers, said thermally sensitive detector comprises a thermally sensitive resistor, such that the temperature change resulting from the leaking fluid coming in contact with the sensor causes a measurable change in resistance of the sensor.

2. The sensor of claim 1, further comprising an affixing mechanism on the one or more flexible isolating layers to affix the sensor to a potential fluid leak source.

3. The sensor of claim 2, wherein the affixing mechanism is glue.

4. The sensor of claim 1, further comprising a first electrical connector and a second electrical connector, each connector located at an end of the sensor, at least one of the first connector and the second connector receptive to coupling with circuitry to at least indirectly measure the temperature change resulting from the leaking fluid coming in contact with the sensor and to which the thermally sensitive detector is responsive.

5. The sensor of claim 1, wherein the measurable change in resistance being ±5% indicates presence of the leaking fluid.

6. The sensor of claim 1, wherein the thermally sensitive resistor is one of nickel and platinum.

7. The sensor of claim 1, wherein the one or more flexible isolating layers are capton.

8. A sensor for fluid leak detection comprising:
   a first flexible fluid isolating layer and a second flexible isolating layer, each layer thermally conductive; and,
   a thermally sensitive resistor situated between the first and the second isolating layers and having a measurable electrical resistance responsive to a temperature change resulting from leaking fluid coming in contact with the sensor; where the leaking fluid is prevented from contacting the thermally sensitive resistor because of said two flexible fluid-isolating layers
   an affixing mechanism on one or more of the first and the second flexible isolating layers to affix the sensor to a potential fluid leak source; and,
   a first electrical connector and a second electrical connector, each connector located at an end of the sensor, at least one of the first connector and the second connector receptive to electrical coupling.

9. The sensor of claim 8, wherein the measurable change in resistance being ±5% indicates presence of the leaking fluid from the potential fluid leak source.

10. The sensor of claim 8, wherein the thermally sensitive resistor is one of nickel and platinum.

11. The sensor of claim 8, wherein one or more of the first and the second flexible isolating layers is capton.

12. The sensor of claim 8, wherein the affixing mechanism is glue.

13. A system for fluid leak detection comprising:
   one or more fluid leak detection sensors connected in one of serial, parallel, and a combination of serial and parallel with one another, each sensor comprising:
      one or more flexible fluid isolating layers, each layer thermally conductive;
      a thermally sensitive detector situated within the one or more isolating layers and responsive to a temperature change resulting from leaking fluid coming in contact with the sensor, the temperature change causing a measurable change in electrical resistance of the sensor; where the leaking fluid is prevented from contacting the thermally sensitive detector because of said flexible fluid-isolating layers and,
   a circuitry electrically coupled to the one or more fluid leak detection sensors and responsive to the measurable change in resistance to detect the leaking fluid.

14. The system of claim 13, each sensor further comprising an affixing mechanism on the one or more flexible isolating layers to affix the sensor to a potential fluid leak source.

15. The system of claim 14, wherein the affixing mechanism of each sensor is glue.

16. The system of claim 13, each sensor further comprising a first electrical connector and a second electrical connector, each connector located at an end of the sensor, at least one of the first connector and the second connector receptive to electrical coupling.

17. The system of claim 13, wherein the thermally sensitive detector of each sensor comprises a thermally sensitive resistor.

18. The system of claim 17, wherein the thermally sensitive resistor of each sensor is one of nickel and platinum.

19. The system of claim 13, wherein the one or more flexible isolating layers of each sensor are capton.

* * * * *